United States Patent
Dang et al.

(10) Patent No.: US 8,973,144 B2
(45) Date of Patent: *Mar. 3, 2015

(54) SYSTEM AND METHOD FOR KERNEL ROOTKIT PROTECTION IN A HYPERVISOR ENVIRONMENT

(75) Inventors: Amit Dang, Uttar Pradesh (IN); Preet Mohinder, New Delhi (IN); Vivek Srivastava, Haryana (IN)

(73) Assignee: McAfee, Inc., Santa Clara, CA (US)

( * ) Notice: Subject to any disclaimer, the term of this patent is extended or adjusted under 35 U.S.C. 154(b) by 565 days.

This patent is subject to a terminal disclaimer.

(21) Appl. No.: 13/272,830

(22) Filed: Oct. 13, 2011

(65) Prior Publication Data

US 2013/0097355 A1   Apr. 18, 2013

(51) Int. Cl.
*G06F 11/00* (2006.01)
*H04L 29/06* (2006.01)
*G06F 12/14* (2006.01)
*G06F 21/55* (2013.01)

(52) U.S. Cl.
CPC ............. *G06F 12/145* (2013.01); *G06F 21/55* (2013.01)
USPC .......................................... 726/24; 713/166

(58) Field of Classification Search
CPC ..... H04L 63/145; G06F 21/56; G06F 21/566; G06F 21/564; G06F 21/562; G06F 12/145
USPC .......... 713/165, 163, 166; 726/24, 21, 26, 27, 726/28; 711/6, 170, 173, 202, 203; 709/223
See application file for complete search history.

(56) References Cited

U.S. PATENT DOCUMENTS

| | | |
|---|---|---|
| 4,688,169 A | 8/1987 | Joshi |
| 4,982,430 A | 1/1991 | Frezza et al. |
| 5,155,847 A | 10/1992 | Kirouac et al. |
| 5,222,134 A | 6/1993 | Waite et al. |
| 5,390,314 A | 2/1995 | Swanson |
| 5,521,849 A | 5/1996 | Adelson et al. |
| 5,560,008 A | 9/1996 | Johnson et al. |
| 5,699,513 A | 12/1997 | Feigen et al. |

(Continued)

FOREIGN PATENT DOCUMENTS

| | | |
|---|---|---|
| EP | 1 482 394 A2 | 12/2004 |
| EP | 2 037 657 A1 | 3/2009 |

(Continued)

OTHER PUBLICATIONS

International Search Report and Written Opinion, International Application No. PCT/US2012/055660, mailed Feb. 18, 2013, 10 pages.

(Continued)

*Primary Examiner* — Abu Sholeman
(74) *Attorney, Agent, or Firm* — Patent Capital Group

(57) ABSTRACT

A method includes creating a soft whitelist having an entry corresponding to a first guest kernel page in a guest operating system (OS) in a hypervisor environment including a hypervisor. The method also includes receiving an access attempt to a second guest kernel page, and generating a page fault when the access attempt is made to the second guest kernel page. In addition, the method includes determining that the second guest kernel page does not correspond to the entry in the soft whitelist, and denying an execution of the second guest kernel page if the second guest kernel page does not correspond to the entry in the soft whitelist.

20 Claims, 2 Drawing Sheets

(56) References Cited

U.S. PATENT DOCUMENTS

| | | | |
|---|---|---|---|
| 5,778,226 A | 7/1998 | Adams et al. | |
| 5,778,349 A | 7/1998 | Okonogi | |
| 5,787,427 A | 7/1998 | Benantar et al. | |
| 5,842,017 A | 11/1998 | Hookway et al. | |
| 5,907,709 A | 5/1999 | Cantey et al. | |
| 5,907,860 A | 5/1999 | Garibay et al. | |
| 5,926,832 A | 7/1999 | Wing et al. | |
| 5,974,149 A | 10/1999 | Leppek | |
| 5,987,610 A | 11/1999 | Franczek et al. | |
| 5,987,611 A | 11/1999 | Freund | |
| 5,991,881 A | 11/1999 | Conklin et al. | |
| 6,064,815 A | 5/2000 | Hohensee et al. | |
| 6,073,142 A | 6/2000 | Geiger et al. | |
| 6,141,698 A | 10/2000 | Krishnan et al. | |
| 6,192,401 B1 | 2/2001 | Modiri et al. | |
| 6,192,475 B1 | 2/2001 | Wallace | |
| 6,256,773 B1 | 7/2001 | Bowman-Amuah | |
| 6,275,938 B1 | 8/2001 | Bond et al. | |
| 6,321,267 B1 | 11/2001 | Donaldson | |
| 6,338,149 B1 | 1/2002 | Ciccone, Jr. et al. | |
| 6,356,957 B2 | 3/2002 | Sanchez, II et al. | |
| 6,393,465 B2 | 5/2002 | Leeds | |
| 6,442,686 B1 | 8/2002 | McArdle et al. | |
| 6,449,040 B1 | 9/2002 | Fujita | |
| 6,453,468 B1 | 9/2002 | D'Souza | |
| 6,460,050 B1 | 10/2002 | Pace et al. | |
| 6,587,877 B1 | 7/2003 | Douglis et al. | |
| 6,611,925 B1 | 8/2003 | Spear | |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | |
| 6,795,966 B1 | 9/2004 | Lim et al. | |
| 6,832,227 B2 | 12/2004 | Seki et al. | |
| 6,834,301 B1 | 12/2004 | Hanchett | |
| 6,847,993 B1 | 1/2005 | Novaes et al. | |
| 6,895,491 B2* | 5/2005 | Kjos et al. | 711/203 |
| 6,907,600 B2 | 6/2005 | Neiger et al. | |
| 6,918,110 B2 | 7/2005 | Hundt et al. | |
| 6,930,985 B1 | 8/2005 | Rathi et al. | |
| 6,934,755 B1 | 8/2005 | Saulpaugh et al. | |
| 6,988,101 B2 | 1/2006 | Ham et al. | |
| 6,988,124 B2 | 1/2006 | Douceur et al. | |
| 7,007,302 B1 | 2/2006 | Jagger et al. | |
| 7,010,796 B1 | 3/2006 | Strom et al. | |
| 7,024,548 B1 | 4/2006 | O'Toole, Jr. | |
| 7,039,949 B2 | 5/2006 | Cartmell et al. | |
| 7,043,616 B1* | 5/2006 | McGrath | 711/163 |
| 7,065,767 B2 | 6/2006 | Kambhammettu et al. | |
| 7,069,330 B1 | 6/2006 | McArdle et al. | |
| 7,082,456 B2 | 7/2006 | Mani-Meitav et al. | |
| 7,093,239 B1 | 8/2006 | van der Made | |
| 7,124,409 B2 | 10/2006 | Davis et al. | |
| 7,139,916 B2 | 11/2006 | Billingsley et al. | |
| 7,152,148 B2 | 12/2006 | Williams et al. | |
| 7,159,036 B2 | 1/2007 | Hinchliffe et al. | |
| 7,177,267 B2 | 2/2007 | Oliver et al. | |
| 7,203,864 B2 | 4/2007 | Goin et al. | |
| 7,251,655 B2 | 7/2007 | Kaler et al. | |
| 7,290,266 B2 | 10/2007 | Gladstone et al. | |
| 7,302,558 B2 | 11/2007 | Campbell et al. | |
| 7,330,849 B2 | 2/2008 | Gerasoulis et al. | |
| 7,346,781 B2 | 3/2008 | Cowle et al. | |
| 7,349,931 B2 | 3/2008 | Horne | |
| 7,350,204 B2 | 3/2008 | Lambert et al. | |
| 7,353,501 B2 | 4/2008 | Tang et al. | |
| 7,363,022 B2 | 4/2008 | Whelan et al. | |
| 7,370,360 B2 | 5/2008 | van der Made | |
| 7,401,358 B1* | 7/2008 | Christie et al. | 726/21 |
| 7,406,517 B2 | 7/2008 | Hunt et al. | |
| 7,441,265 B2 | 10/2008 | Staamann et al. | |
| 7,464,408 B1 | 12/2008 | Shah et al. | |
| 7,506,155 B1 | 3/2009 | Stewart et al. | |
| 7,506,170 B2 | 3/2009 | Finnegan | |
| 7,546,333 B2 | 6/2009 | Alon et al. | |
| 7,546,594 B2 | 6/2009 | McGuire et al. | |
| 7,552,479 B1 | 6/2009 | Conover et al. | |
| 7,603,552 B1 | 10/2009 | Sebes et al. | |
| 7,607,170 B2 | 10/2009 | Chesla | |
| 7,657,599 B2 | 2/2010 | Smith | |
| 7,669,195 B1 | 2/2010 | Qumei | |
| 7,685,635 B2 | 3/2010 | Vega et al. | |
| 7,698,744 B2* | 4/2010 | Fanton et al. | 726/27 |
| 7,703,090 B2 | 4/2010 | Napier et al. | |
| 7,757,269 B1 | 7/2010 | Roy-Chowdhury et al. | |
| 7,765,538 B2 | 7/2010 | Zweifel et al. | |
| 7,783,735 B1 | 8/2010 | Sebes et al. | |
| 7,809,704 B2 | 10/2010 | Surendran et al. | |
| 7,818,377 B2 | 10/2010 | Whitney et al. | |
| 7,823,148 B2 | 10/2010 | Deshpande et al. | |
| 7,836,504 B2 | 11/2010 | Ray et al. | |
| 7,840,968 B1 | 11/2010 | Sharma et al. | |
| 7,849,507 B1 | 12/2010 | Bloch et al. | |
| 7,856,661 B1 | 12/2010 | Sebes et al. | |
| 7,865,931 B1 | 1/2011 | Stone et al. | |
| 7,870,387 B1 | 1/2011 | Bhargava et al. | |
| 7,873,955 B1 | 1/2011 | Sebes et al. | |
| 7,895,573 B1 | 2/2011 | Bhargava et al. | |
| 7,908,653 B2 | 3/2011 | Brickell et al. | |
| 7,917,724 B2* | 3/2011 | Dewan et al. | 711/206 |
| 7,937,455 B2 | 5/2011 | Saha et al. | |
| 7,966,659 B1 | 6/2011 | Wilkinson et al. | |
| 7,996,836 B1 | 8/2011 | McCorkendale et al. | |
| 8,015,388 B1 | 9/2011 | Rihan et al. | |
| 8,015,563 B2 | 9/2011 | Araujo et al. | |
| 8,028,340 B2 | 9/2011 | Sebes et al. | |
| 8,074,276 B1 | 12/2011 | Beloussov et al. | |
| 8,195,931 B1 | 6/2012 | Sharma et al. | |
| 8,234,713 B2 | 7/2012 | Roy-Chowdhury et al. | |
| 8,307,437 B2 | 11/2012 | Sebes et al. | |
| 8,321,932 B2 | 11/2012 | Bhargava et al. | |
| 8,332,929 B1 | 12/2012 | Bhargava et al. | |
| 8,341,627 B2 | 12/2012 | Mohinder | |
| 8,381,284 B2 | 2/2013 | Dang et al. | |
| 8,515,075 B1 | 8/2013 | Saraf et al. | |
| 8,561,061 B2* | 10/2013 | Adams et al. | 718/1 |
| 8,566,935 B2* | 10/2013 | Lagar-Cavilla et al. | 726/22 |
| 8,572,371 B2* | 10/2013 | Gassoway | 713/165 |
| 8,578,080 B2* | 11/2013 | Sahita et al. | 710/267 |
| 8,607,020 B2* | 12/2013 | Jacobs et al. | 711/173 |
| 8,621,605 B2* | 12/2013 | Burugula et al. | 726/22 |
| 8,694,738 B2* | 4/2014 | Bhattacharjee et al. | 711/151 |
| 8,701,189 B2* | 4/2014 | Saraf et al. | 726/23 |
| 8,719,543 B2* | 5/2014 | Kaminski et al. | 711/206 |
| 2002/0056076 A1 | 5/2002 | van der Made | |
| 2002/0069367 A1 | 6/2002 | Tindal et al. | |
| 2002/0083175 A1 | 6/2002 | Afek et al. | |
| 2002/0099671 A1 | 7/2002 | Mastin Crosbie et al. | |
| 2003/0014667 A1* | 1/2003 | Kolichtchak | 713/201 |
| 2003/0023736 A1 | 1/2003 | Abkemeier | |
| 2003/0033510 A1 | 2/2003 | Dice | |
| 2003/0073894 A1 | 4/2003 | Chiang et al. | |
| 2003/0074552 A1 | 4/2003 | Olkin et al. | |
| 2003/0120601 A1 | 6/2003 | Ouye et al. | |
| 2003/0120811 A1 | 6/2003 | Hanson et al. | |
| 2003/0120935 A1 | 6/2003 | Teal et al. | |
| 2003/0145232 A1 | 7/2003 | Poletto et al. | |
| 2003/0163718 A1 | 8/2003 | Johnson et al. | |
| 2003/0167292 A1 | 9/2003 | Ross | |
| 2003/0167399 A1 | 9/2003 | Audebert et al. | |
| 2003/0200332 A1 | 10/2003 | Gupta et al. | |
| 2003/0212902 A1 | 11/2003 | van der Made | |
| 2003/0220944 A1 | 11/2003 | Lyman Schottland et al. | |
| 2003/0221190 A1 | 11/2003 | Deshpande et al. | |
| 2004/0003258 A1 | 1/2004 | Billingsley et al. | |
| 2004/0015554 A1 | 1/2004 | Wilson | |
| 2004/0051736 A1 | 3/2004 | Daniell | |
| 2004/0054928 A1 | 3/2004 | Hall | |
| 2004/0064668 A1* | 4/2004 | Kjos et al. | 711/202 |
| 2004/0143749 A1 | 7/2004 | Tajalli et al. | |
| 2004/0167906 A1 | 8/2004 | Smith et al. | |
| 2004/0230963 A1 | 11/2004 | Rothman et al. | |
| 2004/0243678 A1 | 12/2004 | Smith et al. | |
| 2004/0255161 A1 | 12/2004 | Cavanaugh | |

(56) References Cited

U.S. PATENT DOCUMENTS

| | | |
|---|---|---|
| 2005/0018651 A1 | 1/2005 | Yan et al. |
| 2005/0086047 A1 | 4/2005 | Uchimoto et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0228990 A1 | 10/2005 | Kato et al. |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0107020 A1* | 5/2006 | Stillwell et al. ............... 711/203 |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0150256 A1* | 7/2006 | Fanton et al. .................. 726/27 |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0282892 A1 | 12/2006 | Jonnala et al. |
| 2007/0011746 A1 | 1/2007 | Malpani et al. |
| 2007/0028303 A1 | 2/2007 | Brennan |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2007/0300241 A1 | 12/2007 | Prakash et al. |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0294703 A1 | 11/2008 | Craft et al. |
| 2008/0301770 A1 | 12/2008 | Kinder |
| 2009/0006805 A1 | 1/2009 | Anderson et al. |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0172822 A1 | 7/2009 | Sahita et al. |
| 2009/0249053 A1 | 10/2009 | Zimmer et al. |
| 2009/0249438 A1 | 10/2009 | Litvin et al. |
| 2009/0300612 A1* | 12/2009 | Devine et al. .................. 718/1 |
| 2009/0307445 A1* | 12/2009 | Jacobs et al. ................. 711/154 |
| 2010/0031360 A1* | 2/2010 | Seshadri et al. ............... 726/24 |
| 2010/0071035 A1 | 3/2010 | Budko et al. |
| 2010/0094948 A1 | 4/2010 | Ganesh et al. ................ 709/212 |
| 2010/0114825 A1 | 5/2010 | Siddegowda |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047543 A1* | 2/2011 | Mohinder ....................... 718/1 |
| 2011/0077948 A1 | 3/2011 | Sharma et al. |
| 2011/0078550 A1 | 3/2011 | Nabutovsky |
| 2011/0082962 A1* | 4/2011 | Horovitz et al. ................ 711/6 |
| 2011/0093842 A1 | 4/2011 | Sebes |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2011/0167422 A1* | 7/2011 | Eom et al. ...................... 718/1 |
| 2011/0219447 A1* | 9/2011 | Horovitz et al. ............... 726/22 |
| 2012/0030731 A1 | 2/2012 | Bhargava et al. |
| 2012/0030750 A1 | 2/2012 | Bhargava et al. |
| 2012/0179874 A1 | 7/2012 | Chang et al. |
| 2012/0204263 A1 | 8/2012 | Jonnala et al. |
| 2012/0278853 A1 | 11/2012 | Roy-Chowdhury et al. |
| 2012/0290827 A1 | 11/2012 | Bhargava et al. |
| 2012/0297176 A1 | 11/2012 | Bhargava et al. |
| 2012/0311341 A1* | 12/2012 | Paris et al. .................... 713/179 |
| 2012/0331464 A1 | 12/2012 | Saito et al. |
| 2013/0024934 A1 | 1/2013 | Sebes et al. |
| 2013/0054917 A1* | 2/2013 | Ludwig et al. ............... 711/163 |
| 2013/0086550 A1* | 4/2013 | Epstein ......................... 717/110 |
| 2013/0091318 A1 | 4/2013 | Bhattacharjee et al. |
| 2013/0097355 A1 | 4/2013 | Dang et al. |
| 2013/0097356 A1* | 4/2013 | Dang et al. ..................... 711/6 |
| 2013/0117823 A1 | 5/2013 | Dang et al. |
| 2013/0132690 A1* | 5/2013 | Epstein ......................... 711/159 |
| 2013/0174147 A1* | 7/2013 | Sahita et al. .................... 718/1 |
| 2013/0219462 A1* | 8/2013 | Aratsu et al. .................... 726/1 |
| 2013/0283004 A1* | 10/2013 | Devine et al. ................ 711/206 |
| 2014/0089450 A1* | 3/2014 | Raindel et al. ............... 709/213 |
| 2014/0089451 A1* | 3/2014 | Eran et al. ..................... 709/213 |
| 2014/0143774 A1* | 5/2014 | Adams et al. .................... 718/1 |

FOREIGN PATENT DOCUMENTS

| | | |
|---|---|---|
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |
| WO | 2013/055498 A1 | 4/2013 |
| WO | 2013/055499 A1 | 4/2013 |
| WO | 2013/055502 A1 | 4/2013 |

OTHER PUBLICATIONS

Final Office Action for U.S. Appl. No. 13/273,002, mailed on Jan. 31, 2014, 17 pages.

International Preliminary Report on Patentability in International Application No. PCT/US2012/055660, mailed Apr. 15, 2014, 6 pages.

International Preliminary Report on Patentability in International Application No. PCT/US2012/055670, mailed Apr. 15, 2014, 5 pages.

International Preliminary Report on Patentability in International Application No. PCT/US2012/055674, mailed on Apr. 15, 2014, 5 pages.

Kurt Gutzmann, "Access Control and Session Management in the HTTP Environment," Jan./Feb. 2001, pp. 26-35, IEEE Internet Computing.

(56) References Cited

OTHER PUBLICATIONS

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).
U.S. Appl. No. 10/651,591, entitled "Method and System for Containment of Networked Application Client Software by Explicit Human Input," filed Aug. 29, 2003, Inventor(s): Rosen Sharma et al.
U.S. Appl. No. 11/060,683, entitled "Distribution and Installation of Solidified Software on a Computer," filed Feb. 16, 2005, Inventor(s): Bakul Shah et al.
U.S. Appl. No. 11/379,953, entitled "Software Modification by Group to Minimize Breakage," filed Apr. 24, 2006, Inventor(s): E. John Sebes et al.
U.S. Appl. No. 12/291,232, entitled "Method of and System for Computer System State Checks," filed Nov. 7, 2008, inventor(s): Rishi Bhargava et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/322,220, entitled "Method of and System for Malicious Software Detection Using Critical Address Space Protection," filed Jan. 29, 2009, Inventor(s): Suman Saraf et al.
U.S. Appl. No. 12/322,321, entitled "Method of and System for Computer System Denial-of-Service Protection," filed Jan. 29, 2009, Inventor(s): Suman Saraf et al.
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
U.S. Appl. No. 12/636,414, entitled "System and Method for Managing Virtual Machine Configurations," filed Dec. 11, 2009, Inventor(s): Harvinder Singh Sawhney, et al.
U.S. Appl. No. 12/880,125, entitled "System and Method for Clustering Host Inventories," filed Sep. 12, 2010, Inventor(s) Rishi Bhargava et al.
Barrantes et al., "Randomized Instruction Set Emulation to Disrupt Binary Code Injection Attacks," Oct. 27-31, 2003, ACM, pp. 281-289.
Gaurav et al., "Countering Code-Injection Attacks with Instruction-Set Randomization," Oct. 27-31, 2003, ACM, pp. 272-280.
U.S. Appl. No. 12/903,993, entitled "Method and System for Containment of Usage of Language Interfaces," filed Oct. 13, 2010, Inventor(s) Rosen Sharma, et al.
U.S. Appl. No. 12/946,344, entitled "Method and System for Containment of Usage of Language Interfaces," filed Nov. 15, 2010, Inventor(s) Rosen Sharma, et al.
U.S. Appl. No. 13/012,138, entitled "System and Method for Selectively Grouping and Managing Program Files," filed Jan. 24, 2011, Inventor(s) Rishi Bhargava et al.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Tal Garfinkel, et al., "Terra: A Virtual Machine-Based Platform for Trusted Computing," XP-002340992, SOSP'03, Oct. 19-22, 2003, 14 pages.
U.S. Appl. No. 13/037,988, entitled "System and Method for Botnet Detection by Comprehensive Email Behavioral Analysis," filed Mar. 1, 2011, Inventor(s) Sven Krasser, et al.
IA-32 Intel® Architecture Software Developer's Manual, vol. 3B; Jun. 2006; pp. 13, 15, 22 and 145-146.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
U.S. Appl. No. 13/558,277, entitled "Method and Apparatus for Process Enforced Configuration Management," filed Jul. 25, 2012, Inventor(s) Rishi Bhargava et al.
U.S. Appl. No. 11/437,317, entitled "Connectivity-Based Authorization," filed May 18, 2006, Inventor(s): E. John Sebes et al.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.lst.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.
"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.
U.S. Appl. No. 13/728,705, filed Dec. 27, 2012, entitled "Herd Based Scan Avoidance System in a Network Environment," Inventor(s) Venkata Ramanan, et al.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.
Shacham, et al., "On the Effectiveness of Address-Space Randomization," CCS'04, Oct. 25-29, 2004, Washington, D.C., Copyright 2004, 10 pages.

(56) References Cited

OTHER PUBLICATIONS

International Search Report and Written Opinion mailed Dec. 14, 2012 for International Application No. 04796-1087WO, 9 pages.
International Search Report and Written Opinion mailed Jan. 25, 2013 for International Application No. PCT/US2012/055670 (7 pages).
Lecture Embedded System Security, Chapter 6: Return-oriented Programming, Prof. Dr.-Ing. Ahmad-Reza Sadeghi, et al., Technische Universitat Damstadt (CASED), Germany, Summer Term 2011, http://www.trust.informatik.tu-darmstadt.de/fileadmin/user_upload/Group_TRUST/LectureSlides/ESS-SS2011/rop-grayscale.pdf[Background on Butter Overflow Attacks/Sadeghi et al./2011, 51 pages.
Notice of Allowance received for U.S. Appl. No. 12/322,220, mailed on Apr. 17, 2013, 14 pages.
Final Office Action received for U.S. Appl. No. 12/545,745, mailed on Jun. 7, 2012, 14 pages.
Non Final Office Action received for U.S. Appl. No. 12/545,745, mailed on Jan. 5, 2012, 12 pages.
Notice of Allowance received for U.S. Appl. No. 12/545,745, mailed on Aug. 29, 2012, 8 pages.
Response to Final Office Action and RCE for U.S. Appl. No. 12/545,745, filed Jul. 31, 2012, 15 pages.
Response to Non Final Office Action for U.S. Appl. No. 12/545,745, filed Mar. 28, 2012, 12 pages.
"Shadow Walker" Raising the Bar for Rootkit Detection by Sherri Sparks and Jamie Butler, Black Hat Japan 2005, Tokyp, Japan, Oct. 17-18, 2005, 55 pages.
Countering Kernel Rootkits with Lightweight Hook Protection, available at http://research.microsoft.com/en-us/um/people/wdcui/papers/hooksafe-ccs09.pdf, 16th ACM Conference on Computer and Communications Security (CCS 2009) Chicago, IL, Nov. 2009, 10 pages.
Detecting Kernel Rootkits, by Rainer Whichmann, available at http://www.la-samhna.de/library/rootkits/detect.html, copyright 2006, 2 pages.
Guest-Transparent Prevention of Kernel Rootkits with VMM-Based Memory Shadowing, 11th International Symposium on Recent Advances in Intrusion Detection, Cambridge, Massachusetts (Sep. 15-17, 2008), 20 pages.
McAfee Proven Security, Rootkits, Part 1 of 3: The Growing Threat (Apr. 2006), available at www.mcafee.com, 8 pages.
Multi-Aspect Profiling of Kernel Rootkit Behavior, Eurosys Conference 2009, Nuremberg, Germany, Mar. 30-Apr. 3, 2009, 14 pages.
Rootkits Part 2: A Technical Primer, available at www.mcafee.com (http://www.mcafee.com/cf/about/news/2007/20070418_174400_d.aspx) Apr. 18, 2007, 16 pages.
SecVisor: A Tiny Hypervisor to Provide Lifetime Kernel Code Integrity for Commodity OSes, Proceedings of the 21st ACM SIGOPS Symposium on Operating Systems Principles, Stevenson, WA (Oct. 14-17, 2007), 16 pages.
Stopping Rootkits at the Network Edge (Jan. 2007) http://www.trustedcomputinggroup.org/files/resource_files/C2426F48-1D09-3519-AD02D13C71B888A6/Whitepaper_Rootkit_Strom_v3.pdf, 3 pages.
Transparent Protection of Commodity OS Kernels Using Hardware Virtualization, 6th International ICST Conference on Security and Privacy in Communication Networks, Singapore, Sep. 7-9, 2010, 18 pages.
Xen Architecture Overview, Feb. 13, 2008, available at http://wiki.xen.org/xenwiki/XenArchitecture?action=AttachFile&do=get&target=Xen+Architecture_Q1+2008.pdf, 9 pages.
USPTO Nov. 27, 2013 Notice of Allowance in U.S. Appl. No. 12/322,321, 15 pages.
"A Linear-Time Heuristic for Improving Network Partitions," http://ieeexplore.ieee.org/stamp/stamp.jsp?tp=&arnumber=1585498; Fiduccia et al., pp. 175-181, 1982, 7 pages.
USPTO Nov. 12, 2013 Notice of Allowance in U.S. Appl. No. 13/271,102, 11 pages.
International Search Report received for PCT Application No. PCT/US2012/055674, mailed on Dec. 14, 2012, 2 pages.
Nonfinal Office Action for U.S. Appl. No. 13/273,002, mailed on Oct. 4, 2013, 17 pages.
Grace, Michael, et al., "Transparent Protection of Commodity OS Kernels Using Hardware Virtualization," 2010, SecureComm 2010, LNICST 50, pp. 162-180, 19 pages.
Riley, Ryan, et al., "Guest-Transparent Prevention of Kernel Rootkits with VMM-Based Memory Shadowing," 2008, RAID 2008, LNCS 5230, pp. 1-20, 20 pages.
Milos, Grzegorz, et al., "Satori: Enlightened page sharing," Proceedings of the 2009 conference on USENIX Annual technical conference, 14 pages.
USPTO Notice of Allowance for U.S. Appl. No. 13/273,002, mailed on Apr. 24, 2014, 9 pages.
USPTO Notice of Allowance for U.S. Appl. No. 13/273,002, mailed on Oct. 1, 2014, 8 pages.

\* cited by examiner

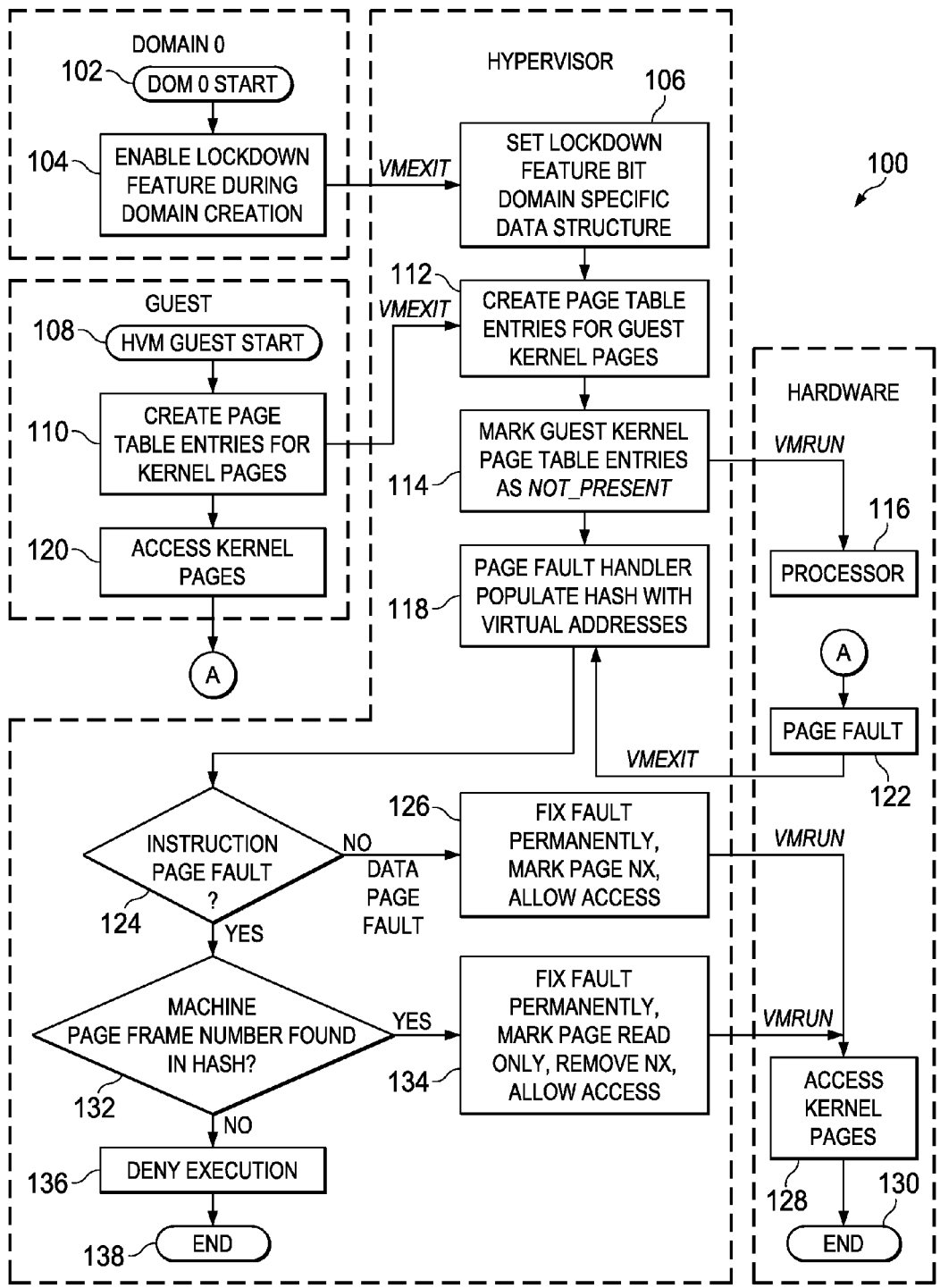

SYSTEM AND METHOD FOR KERNEL ROOTKIT PROTECTION IN A HYPERVISOR ENVIRONMENT

TECHNICAL FIELD

This disclosure relates in general to the field of computer networks and, more particularly, to a system and a method for kernel rootkit protection in a hypervisor environment.

BACKGROUND

The field of computer network security has become increasingly important and complicated in today's society. Computer network environments are configured for virtually every enterprise or organization, typically with multiple interconnected computers (e.g., end user computers, laptops, servers, printing devices, etc.). Moreover, cloud service providers (and other organizations that run multiple applications and operating systems) may use hypervisor technology to run various different guest operating systems concurrently on a host device. A hypervisor is computer software/hardware platform virtualization software that allows multiple operating systems to run on a host computer concurrently. Security threats can originate externally and internally in the hypervisor environment. These threats in the hypervisor environment can present further challenges to IT administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified flow-chart illustrating example operational steps that may be associated with embodiments of the present disclosure.

DETAILED DESCRIPTION OF EXAMPLE EMBODIMENTS

Overview

Figure 1:
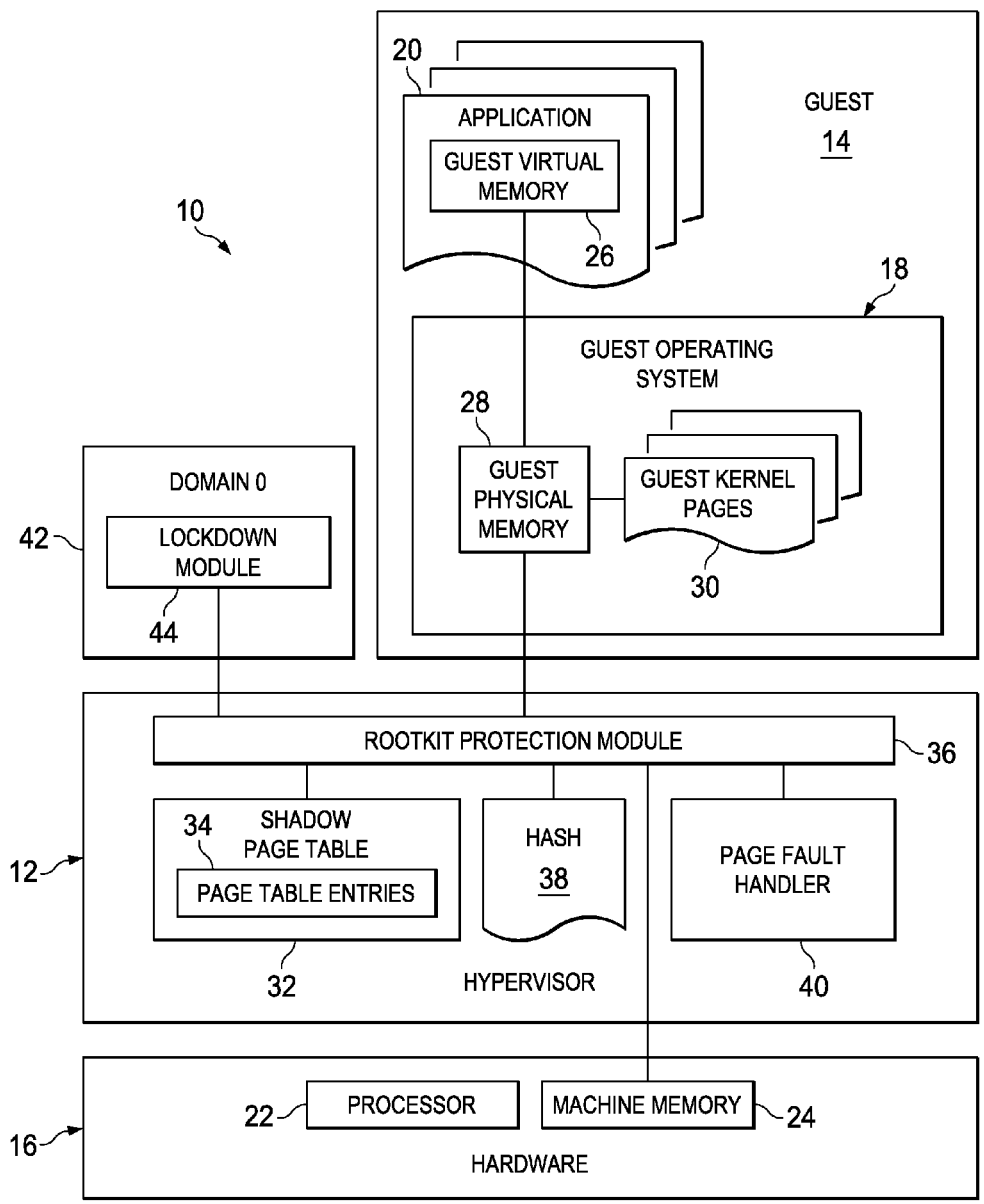
FIG. 1 is a simplified block diagram illustrating components of a system for kernel rootkit protection in a hypervisor environment according to an example embodiment.

A system and method in one embodiment includes modules for creating a soft whitelist having entries corresponding to each guest kernel page in a guest operating system in a hypervisor environment, generating a page fault when an access attempt is made to a guest kernel page, fixing the page fault to allow access and execution if the guest kernel page corresponds to one of the entries in the soft whitelist, and denying execution if the guest kernel page does not correspond to any of the entries in the soft whitelist. In example embodiments, the soft whitelist includes a hash of machine page frame numbers corresponding to virtual addresses of each guest kernel page.

Other example embodiments include marking the guest kernel page as read-only and executable if the page fault is an instruction page fault, and the guest kernel page corresponds to one of the entries in the soft whitelist. If the page fault is a data page fault and the guest kernel page does not correspond any of the entries in the soft whitelist, the method includes fixing the page fault, and marking the guest kernel page as non-executable.

More specific embodiments include marking page table entries corresponding to each guest kernel page as NOT_PRESENT in a shadow page table of the hypervisor. In yet other example embodiments, the method includes denying execution by causing the guest OS to loop indefinitely, injecting an exception in the guest OS, or fixing the page fault and pointing a corresponding PTE in the shadow page table to a crafted page instead of the guest kernel page. The crafted page can include code that either causes the guest OS to crash, or a set of No Operations (NOP) instructions that execute harmlessly.

In yet other example embodiments, creating the soft whitelist may be performed after the guest OS has loaded substantially all its kernel components at boot. If the guest OS has not loaded substantially all its kernel components, each guest kernel page may be from a paged pool range or a non-paged pool range. Yet another embodiment includes setting a lockdown feature bit in the hypervisor during domain creation to enable rootkit protection and other features.

Example Embodiments

FIG. 1 is a simplified block diagram illustrating an example implementation of a system 10 for kernel rootkit protection in a hypervisor environment. As used herein, a "hypervisor" is a hardware virtualization entity that allows one or more operating systems (OSs), termed "guest OSs," to run concurrently on a host device (e.g., a computer). Virtualization allows the guest OSs to run unmodified on isolated virtual environments (typically referred to as virtual machines or guests), where the host device's physical characteristics and behaviors are reproduced. More specifically, a guest can represent an isolated, virtual environment equipped with virtual hardware (processor, memory, disks, network interfaces, etc.). According to the embodiment illustrated in FIG. 1, system 10 comprises a hypervisor 12, which provides a virtualization environment to a guest 14. Any number of guests may be hosted on hypervisor 12 within the broad scope of the present disclosure. A single guest is representatively illustrated in FIG. 1 for ease of explanation.

Hypervisor 12 controls and manages hardware 16 of a host device (not shown) that is allocated for use by guest 14. Guest 14 may run a guest OS 18 on hypervisor 12. Guest OS 18 may support one or more applications 20 (referred to herein in the singular as application 20 to refer to one of the applications). As used herein, the term "application" is used in a broad sense to refer generically to any software file, library module, function, subroutine, binary, instruction set, code block, or other similar operating unit that comprises instructions that can be understood and processed by a computer with or without assistance (e.g., compilation, interpretation, etc.).

Hypervisor 12 may manage access of applications 20 to underlying hardware 16, such as a processor 22 and a machine memory 24. As used herein, "machine memory" refers to a memory element that is visible to hypervisor 12 as available on the host device. Guest OS 18 may present to applications 20 a guest virtual memory 26, which accesses a guest physical memory 28. As used herein, the term "guest virtual memory" refers to a substantially continuous virtual address space that is visible to applications 20 running inside guest 14. An address space refers to a range of discrete addresses, each of which may correspond to a memory location (i.e., address) at which an application (e.g., application 20) can store data and retrieve data later. As used herein, the term "guest physical memory" refers to the virtual memory that is visible to guest OS 18.

Guest physical memory 28 may create kernel pages 30 during operation. When guest OS loads its guest kernel into memory, the guest kernel is divided into pages (e.g., guest kernel pages 30), with some pages containing kernel instructions, and other pages containing kernel data. Each page, including each of guest kernel pages 30, is typically of standard size (e.g., 4 kB), and is associated with an address (e.g., guest virtual address). Guest OS 18 maps the virtual address of each page to a corresponding "physical" address through page tables. Although the guest memory (e.g., guest virtual memory 26 and guest physical memory 28) is virtual, guest OS 18 assumes that guest physical memory 28 is real or "physical." However, the guest physical memory (e.g., guest physical memory 28) is merely an abstraction utilized by hypervisor 12 for maintaining correct mapping to the (real) host physical address (also called machine address).

A page table is a data structure used by guest OS 18 to store a mapping between virtual addresses and "physical" addresses. A page table contains several page table entries (PTEs), each PTE mapping a virtual address to a corresponding "physical" address (e.g., from guest virtual address to guest physical address or from guest physical address to machine address). The PTE includes the "physical" address (e.g., guest physical address or machine address) and other information relevant to a page in the appropriate memory element (e.g., guest physical memory 28 or machine memory 24), such as whether the page is present, the page is read-only or read/write, etc.

Shadow page table 32 can be used by hypervisor 12 to map guest physical memory 28 to machine memory 24 for a currently executing process. A "process" is an instance of an application (or a portion thereof), whose instructions are being executed. Shadow page table 32 includes page table entries (PTEs) 34 corresponding to guest kernel pages 30. Each of PTEs 34 includes the machine address and other information relevant to the respective kernel page that is loaded into machine memory 24. According to an example embodiment, PTEs 34 may be marked as NOT_PRESENT in shadow page table 32. In example embodiments, whenever any new kernel page is created in guest OS 18, the corresponding PTE 34 in shadow page table 32 may be marked as NOT_PRESENT by default.

A rootkit protection module 36 in hypervisor 12 can add machine frame numbers (MFNs) corresponding to virtual addresses of guest kernel pages 30 into a hash 36. In one example implementation MFN refers to the page number allocated in machine memory 24 for corresponding virtual addresses. A page fault handler 40 may conditionally allow or deny access to or execution of appropriate guest kernel pages 30. A domain 0 (DOM0) 42 running on hypervisor 12 may have special rights to access physical hardware 16 as well as to interact with other guests running on the system. DOM0 42 may have a lockdown module 44 for controlling certain lockdown features of rootkit protection module 36 in hypervisor 12.

For purposes of illustrating the techniques of system 10, it is important to understand the activities and security concerns that may be present in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical computing architecture supports four rings (numbered 0 to 3) of privilege levels to protect system code and data from being unintentionally or maliciously overwritten by lower privileged code. Ring 0 is the highest privilege level, while ring 3 is the lowest. OSs may use different privilege levels for different processes. For example, Windows OS uses two privilege levels (rings 0 and 3) for process and data security. Code for applications such as Internet Explorer and Microsoft Word and a number of Windows services (e.g., Service Control Manager, Local System Security Authority, Winlogon, Session Manager, and RPC Server, etc.) run within ring 3.

Kernel-level code runs within ring 0 and is used in device drivers and kernel components such as managers for virtual memory, cache, Input/Output, object, plug and play, a hardware abstraction layer, graphics subsystem, file systems, and network protocol implementations. A kernel connects applications to the hardware of a computing device. In general, a kernel comprises several components that could vary depending on the OS. For example, Linux OS may include components such as low level drivers (e.g., architecture specific drivers responsible for central processing unit (CPU), memory management unit (MMU) and on-board devices initialization); process scheduler (e.g., component responsible for fair CPU time slice allocation to different processes); memory manager (e.g., component responsible for allocating and sharing memory to different processes); file system (e.g., components that abstract underlying file systems so as to present a unified file system interface to a user); network interface (e.g., component that provides access and control to different networking devices); device drivers (e.g., high level drivers), etc. Applications generally use system function calls (e.g., Win 32 API calls) to communicate with the kernel.

A rootkit alters the flow of a normal execution path (e.g., of a process in an application) to make its stealth implementation successful. A rootkit is software that enables continued privileged access to a device while actively hiding its presence by subverting standard OS functionality. Rootkits normally modify the data returned by system function calls to hide their binary files, processes, and registry entries. Depending on where they run and what area in the system they hook, rootkits can generally be classified in one of two types: user mode rootkits and kernel rootkits. User-mode rootkits are relatively easy to detect and repair because they execute with user-mode privileges. Kernel rootkits, on the other hand, execute with system privileges, making them more challenging to detect and repair. Kernel rootkits load (i.e., inject) their code into the kernel address space, typically by installing a kernel-mode device driver. For example, kernel rootkits may be installed by injecting kernel code into a running kernel using a kernel module, or by writing new code to a piece of unused kernel memory, or by inserting a kernel module file, etc. Once the delivery mechanism is in place, kernel rootkits can disrupt the flow of the normal execution path of a process.

Kernel rootkits are a significant challenge in desktop security. Kernel rootkits can launch various attacks such as opening system backdoors, stealing private information, disabling security measures, and executing other malware applications. Typically, an attacker installs a kernel rootkit on a computer after first obtaining root-level access, either by exploiting a known vulnerability or by obtaining a password (e.g., by cracking the encryption, through social engineering, etc.). Once a kernel rootkit is installed, it allows an attacker to mask the ongoing intrusion and maintain privileged access to the computer by circumventing normal authentication and authorization mechanisms. Kernel rootkits may be hard to detect because a kernel rootkit may be able to subvert the software that is intended to find it. Detection methods include using an alternate, trusted operating system; behavioral-based methods; signature scanning; difference scanning; and memory dump analysis. Removal can be complicated or practically impossible, especially in cases where the kernel rootkit resides in the kernel.

In a hypervisor environment, effects of an attack may be severe. One infected guest could infect all other guests on the host device. For example, an attacker can get administrator privileges on hardware by infecting a guest, and can move from one guest to another over the hypervisor environment. In situations where the hypervisor hosts tens of hundreds of guests, such a guest-to-guest attack can have catastrophic results.

Hypervisor environments present an opportunity to provide kernel rootkit protection without the need for a guest-resident protective software. Guests run on top of the hypervisor in a virtualized host device. Traditional kernel rootkit protection mechanisms can be installed on each instance of the guest running on the hypervisor; however such methods result in significant overhead in terms of memory, run time performance and management. Ideally, kernel rootkit protection mechanisms would sit outside the kernel (which is being protected by it), which may not be possible in non-virtualized environments. Moreover, customers running guests in cloud (virtualized) environments may like the cloud service providers to provide kernel rootkit protection transparently.

In one method of kernel rootkit protection, a hash function can be used to compute a digital signature of on-disk code libraries. The hash function creates a message digest, which is a fixed size bit string that may be calculated for an arbitrary block of data such that a change to the data can change the hash value. By recalculating and comparing the message digest of the on-disk code libraries at regular intervals against a trusted list of fingerprints, changes in the system can be detected and monitored. However, current methods check only whether the code has been modified since the last release by the code's publisher. Also, kernel rootkits may subvert this process by loading from memory, rather than making modifications on disk. Other rootkit protection solutions may be based on commodity OS. There is a need for software for virtualized environments that provides agent-less protection.

A system for kernel rootkit protection in a hypervisor environment outlined by FIG. 1 can resolve these issues, among others. Embodiments of the present disclosure seek to vastly improve capabilities of existing technologies to allow for a more robust solution. In example embodiments, components of system 10 may create a soft whitelist, for example, hash 38, of guest kernel pages 30 inside hypervisor 12. The soft whitelist comprises entries corresponding to each guest kernel page 30 in guest OS 18. In example embodiments, the soft whitelist is intended to comprise a list of approved guest kernel pages that are each represented by a corresponding machine page frame number (MFN), for example, instead of a checksum of the entire page content. In example embodiments, the soft whitelist (i.e., hash 38) includes a hash of MFNs corresponding to guest kernel pages 30.

According to an example embodiment, the soft-whitelist may be created after guest OS 18 has booted and has loaded its kernel components (e.g., process scheduler, memory manager, file systems, etc.). As used herein, the term "boot" refers to a boot sequence, which is the initial set of operations that a computer performs when power is switched on. Thereafter, system 10 can ensure that code cannot be executed from any new kernel page that is not present in the soft-whitelist. According to another example embodiment, the soft whitelist may be created before guest OS 18 has booted and loaded its kernel components. Kernel pages 30 may be in paged and non-paged pools (because all kernel drivers are loaded in these pages). The page start addresses for each faulting virtual address in the paged pool and non-paged pool range may be stored in a hash table (e.g., in hash 38) in hypervisor 12.

System 10 can protect against day-zero threats, for example, as it is based on white-listing. In example embodiments, system 10 may be implemented by public cloud infrastructure providers and companies employing private clouds. System 10 may provide a transparent layer of security. The solution may be especially useful for customers who do not change their base OS configuration frequently, but rather change the data stored on it (e.g., a web host service provider).

Turning to memory management in a hypervisor environment, the guest OS (e.g., guest OS 18) provides a virtual address space layout in guest virtual memory (e.g., guest virtual memory 26) to applications (e.g., application 20). The address space of the guest virtual memory may be divided into user space, which is accessible to applications (e.g., applications 20), and system space, which includes boot drivers, process page tables, system cache, paged and non-paged pools, etc. Typically, the address locations of the system pages are hardcoded (or known apriori). For example, a 4 GB of the guest virtual memory may be separated into 3 GB of user space, with addresses ranging from 0xBFFFFFFF to 0x00000000, and system space, with addresses ranging from 0xFFFFFFFF to 0xC0000000.

The guest OS handles virtual to physical address mappings through page tables. While virtual address space (e.g., guest virtual memory 26) is generally contiguous, the addresses may be mapped to non-contiguous blocks in the physical address space (e.g., guest physical memory 28). Virtual to physical mapping information is placed in a page table in structures called page table entries (PTEs). The format of the PTEs may vary with the OS, for example, Linux OS may specify one format, and Windows XP OS may specify another format. In general, PTEs typically contain a bit to indicate whether the page referenced by the PTE is present (or valid). For example, when a process begins loading into machine memory (e.g., machine memory 24), the guest OS assumes that the pages are loading into guest physical memory (e.g., guest physical memory 28), and generates corresponding page tables. The present bit for the pages being loaded into machine memory are set to 0 (indicating NOT_PRESENT) until all the pages are loaded into memory. Once all the pages are loaded, the present bit for the pages may be set to 1 (indicating PRESENT) in the respective PTEs. During the loading, if an attempt is made to access a page marked NOT_PRESENT, a page fault may be generated.

In example embodiments, any page table maintained by guest 14 may have a corresponding shadow page table (e.g., shadow page table 32), which is generated and maintained by hypervisor 12. Guest OS 18 does not have access to shadow page table 32. At boot, guest OS 18 may load its kernel to memory (e.g., in the form of guest kernel pages 30) from the computer's hard disk. Rootkit protection module 36 may mark PTEs 34 corresponding to guest kernel pages 30 as NOT_PRESENT in shadow page table 32. In one example, rootkit protection module 36 may determine that a page is one of guest kernel pages 30 by reading a virtual address of the page. If the virtual address lies within a particular range (e.g., predetermined range), the page may be one of guest kernel pages 30, and corresponding PTE 34 may be marked as NOT_PRESENT.

When a page fault occurs, control transfers from the processor (e.g., processor 22) executing the instruction that caused the page fault to the hypervisor (e.g., hypervisor 12). The hypervisor's page fault handler (e.g., page fault handler 40) can determine the instruction pointer and the faulting address, for example, to determine whether the page fault is an instruction page fault or a data page fault. For example, if the instruction pointer (i.e., the pointer pointing to the memory address, which the processor will next attempt to execute) points to the faulting address, then the page fault is an instruction page fault.

Turning to the infrastructure of FIG. 1, hypervisor 12 can run multiple instances of guest OSs. Hypervisor 12 can be part of a server, a firewall, an antivirus solution, or more generically, a computer. In one example implementation, hypervisor 12 is a Xen element, which runs on bare hardware and which provides the capability of running multiple instances of OSs simultaneously on the same hardware. A typical Xen setup may involve Xen running beneath multiple OSs, where applications are on top of the OSs, which are associated with a group of guests (e.g., guest 14). The entire configuration may be provided in a server (or some other network appliance). In an example embodiment, guest 14 can be running an OS associated with DOM0 42. Note that the Xen implementation is only representing one possible example to which the present disclosure can apply. Any number of additional hypervisors could similarly benefit from the broad teachings discussed herein.

Control tools for managing hypervisor 12 can run on DOM0 42. DOM0 42 may provide a unified interface to manage guests (e.g., guest 14) on hypervisor 12. DOM0 42 may provide a means for an administrator to configure hypervisor 12, including managing storage, controlling aspects of guest behavior, setting up virtual networks, configuring a hypervisor and one or more guests, and creating, deleting, shutting down, booting up, etc. guests. For example, this kind of setup can be popular in data centers where servers run Xen, which in turn hosts multiple instances of guests. DOM0 42 may include modified Linux kernel, and can have special rights to access physical I/O resources, as well as interact with the other virtual machines running on the system. Typically, DOM0 42 is the first domain launched when the system is booted, and it can be used to create and configure all other regular guests (e.g., guest 14). The hypervisor environments can require DOM0 42 to be running before other guests can be started.

Turning to FIG. 2, FIG. 2 is a simplified flow-chart illustrating example operational steps that may be associated with embodiments of the present disclosure. Operations 100 may begin in 102, when DOM0 42 is activated. In 104, a lockdown feature during domain creation may be enabled (associated with a VMEXIT transition from a guest context to a hypervisor context) by lockdown module 44. In 106, a lockdown feature bit in a domain specific data structure may be set in hypervisor 12. In 108, a hypervisor virtual machine (HVM) (i.e., guest 14) may be started. In 110, guest OS 18 may create page table entries (PTEs) for guest kernel pages 30, with a VMEXIT to hypervisor 12. In 112, rootkit protection module 36 may create PTEs 34 for guest kernel pages 30 in shadow page table 32. In 114, rootkit protection module 36 may mark guest kernel pages 30 as NOT_PRESENT in shadow page table 32 maintained by hypervisor 12. In addition, this operation may be provided along with a virtual machine instruction (VMRUN) associated with processor 22 in 116.

If rootkit protection has been enabled (e.g., guest OS 18 has booted up and loaded its kernel components), page fault handler 40 may perform activities such as walking shadow page table 32 in hypervisor 12 and adding virtual addresses (e.g., corresponding to pages that have not been previously accessed) into hash 38. In an example embodiment, the activities occur one time after guest OS 18 has completed booting up, and subsequently, system 10 may be considered locked.

In 120, an application 20 in guest OS 14 may attempt to access guest kernel pages 30. Attempting to access guest kernel pages 30 can cause a page fault in 122 (as guest kernel pages 30 have been marked as NOT_PRESENT). Note that if rootkit protection is not enabled (e.g., guest OS 18 has not booted up and loaded its kernel components) and if the page fault is outside a paged pool and non-paged pool range, then page fault handler 40 may simply fix the page fault and store the page start address for each faulting virtual address (e.g., in paged pool and non paged pool range) in hash 38. Access may be allowed to these addresses, which are outside the paged pool and non paged pool range, because kernel drivers are generally loaded within the paged pool and non paged pool range.

When a page fault is encountered in 122, a determination is made in 124 if the page fault is an instruction page fault or a data page fault. If the page fault is a data page fault, then the soft whitelist (i.e., hash 38) is searched for an MFN corresponding to the faulting virtual address. If the MFN of the faulting virtual address is present in hash 38, then the page associated with the page fault is legitimate. Accordingly, in 126, page fault handler 40 may permanently fix the page fault to allow future access/execution of the page. On the other hand, if an MFN corresponding to the faulting virtual address is not present in hash 38, then the kernel page is new and any attempts to write to it could include code or data. Accordingly, page fault handler 40 may fix the page fault permanently and mark the page NX (no-execute) in 126. This can ensure that minimum page faults occur, while preventing any new kernel pages from being accessed or executed. Other pages can continue to be read/writable without any page fault until an attempt is made to execute the page. Application 20 may be allowed to access shadow page table 32 in 128 and the process ends in 130.

If the determination in 124 is that the page fault is an instruction fault, page fault handler 40 may check in 132 if the MFN for the faulting virtual address is present in hash 38. If present, page fault handler 40 may fix the page fault permanently (e.g., allow future access/execution) in 134, and mark the page read-only, remove any NX and allow access/execution. If the page is not present in hash 38, it can mean that the page is a new kernel page and page fault handler 40 may deny execution in 136. Denial of execution can be done in several ways: (i) page fault is not fixed, causing faulting thread in guest 14 to loop indefinitely; (ii) page fault is not fixed and an exception may be injected in guest 14. The exception may be caught by the faulting process. If the process does not handle this exception, it may be killed; (iii) page fault may be fixed, but the shadow PTE 34 associated with the faulting page may be made to point to a crafted page instead of the desired page. The crafted page can be configured with code that either causes guest 14 to crash, or causes No Operations Performed (NOPs) instructions to be executed harmlessly. Other examples are "blue-screening" guest 14, inserting a dummy page that causes an exit gracefully, etc. The process may end in 138.

Software for kernel rootkit protection (as well as inhibiting dangerous code from being executed) can be provided at various locations (e.g., within rootkit protection module 36). In one example implementation, this software is resident in a computer sought to be protected from a security attack (or protected from unwanted, or unauthorized manipulations of a writeable memory area). In a more detailed configuration, this software is specifically resident in a security layer of the hypervisor, which may include (or otherwise interface with) the components depicted by FIG. 1. In still other embodiments, software could be received or downloaded from a web server (e.g., in the context of purchasing individual end-user licenses for separate devices, separate virtual machines, guests, hypervisors, servers, etc.) in order to provide this kernel rootkit protection.

In other examples, the kernel rootkit protection functions could involve a proprietary element (e.g., as part of an anti-virus solution), which could be provided in (or be proximate to) these identified elements, or be provided in any other device, server, network appliance, console, firewall, switch, information technology (IT) device, etc., or be provided as a complementary solution (e.g., in conjunction with a firewall), or provisioned somewhere in the network. As used herein in this Specification, the term 'computer' is meant to encompass these possible elements (VMMs, hypervisors, Xen devices, virtual devices, network appliances, routers, switches, gateway, processors, servers, loadbalancers, firewalls, or any other suitable device, component, element, or object) operable to affect or process electronic information in a security environment. Moreover, this computer may include any suitable hardware, software, components, modules, interfaces, or objects that facilitate the operations thereof. This may be inclusive of appropriate algorithms and communication protocols that allow for the effective protection against kernel rootkits. In addition, the kernel rootkit protection functions can be consolidated in any suitable manner. Along similar design alternatives, any of the illustrated modules and components of the various FIGURES may be combined in various possible configurations: all of which are clearly within the broad scope of this Specification.

Any of these elements (e.g., a computer, a server, a network appliance, a firewall, a hypervisor, any other type of virtual element, etc.) may include a processor that can execute software or an algorithm to perform the kernel rootkit protection activities as discussed in this Specification. Additionally, each of these elements (e.g., a computer, a server, a network appliance, a firewall, a hypervisor, any other type of virtual element, etc.) can include memory elements (random access memory (RAM), ROM, EPROM, EEPROM, ASIC, etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe.

These elements and/or modules can cooperate with each other in order to perform the activities in connection with kernel rootkit protection in a hypervisor environment as discussed herein. In other embodiments, these features may be provided external to these elements, included in other devices to achieve these intended functionalities, or consolidated in any appropriate manner. For example, some of the processors associated with the various elements may be removed, or otherwise consolidated such that a single processor and a single memory location are responsible for certain activities. In a general sense, the arrangement depicted in FIGURES may be more logical in its representation, whereas a physical architecture may include various permutations, combinations, and/or hybrids of these elements.

Any of the memory items discussed herein (e.g., guest kernel pages 30, shadow page table 32, machine memory 24, guest virtual memory 26, guest physical memory 28, hash 38, etc.) should be construed as being encompassed within the broad term 'memory element.' Similarly, any of the potential processing elements, modules, and machines described in this Specification should be construed as being encompassed within the broad term 'processor.' Each of the computers, network appliances, virtual elements, etc. can also include suitable interfaces for receiving, transmitting, and/or otherwise communicating data or information in a hypervisor environment.

A processor can execute any type of instructions associated with the data to achieve the operations detailed herein in this Specification. In one example, the processor (as shown in the FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable ROM (EEPROM)) or an ASIC that includes digital logic, software, code, electronic instructions, or any suitable combination thereof.

In certain example implementations, the kernel rootkit protection functions outlined herein may be implemented by logic encoded in one or more tangible, nontransitory media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in the FIGURES) can store data used for the operations described herein. This includes the memory element being able to store software, logic, code, or processor instructions that are executed to carry out the activities described in this Specification. In various embodiments, some or all of these elements include software (or reciprocating software) that can coordinate, manage, or otherwise cooperate in order to achieve the operations as outlined herein. One or more of these elements may include any suitable algorithms, hardware, software, components, modules, interfaces, or objects that facilitate the operations thereof.

Note that with the numerous examples provided herein, interaction may be described in terms of two, three, four, or more network elements and modules. However, this has been done for purposes of clarity and example only. It should be appreciated that the system can be consolidated in any suitable manner. Along similar design alternatives, any of the illustrated modules, components, and elements of FIG. 1 may be combined in various possible configurations, all of which are clearly within the broad scope of this Specification. In certain cases, it may be easier to describe one or more of the functionalities of a given set of flows by only referencing a limited number of elements or components. It should be appreciated that the system of FIG. 1 (and its teachings) is readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method, comprising:
creating a soft whitelist having an entry corresponding to a first guest kernel page in a guest operating system (OS) in a hypervisor environment comprising a hypervisor;
receiving an access attempt to a second guest kernel page;
generating a page fault when the access attempt is made to the second guest kernel page;
determining whether the second guest kernel page corresponds to the entry in the soft whitelist;
fixing the page fault to allow an access and execution of the second guest kernel page if the second guest kernel page corresponds to the entry in the soft whitelist; and
denying an execution of the second guest kernel page if the second guest kernel page does not correspond to the entry in the soft whitelist.

2. The method of claim 1, further comprising:
marking the first guest kernel page as read-only and executable if the page fault is an instruction page fault and the second guest kernel page corresponds to the entry in the soft whitelist.

3. The method of claim 1, further comprising:
if the page fault is a data page fault and the second guest kernel page does not correspond to the entry in the soft whitelist:
fixing the page fault; and
marking the second guest kernel page as non-executable.

4. The method of claim 1, wherein the creating the soft whitelist comprises adding a machine page frame number (MFN) corresponding to a virtual address of the first guest kernel page into a hash.

5. The method of claim 1, further comprising:
marking a page table entry (PTE) corresponding to the first guest kernel page as NOT_PRESENT in a shadow page table of the hypervisor.

6. The method of claim 5, wherein
the denying the execution comprises one of:
causing the guest OS to loop;
injecting an exception in the guest OS; or
fixing the page fault and pointing a corresponding PTE in the shadow page table to a crafted page instead of the second guest kernel page, wherein the crafted page comprises code that either causes the guest OS to crash or executes a set of No Operations (NOP) instructions.

7. The method of claim 1, wherein the creating the soft whitelist is performed after the guest OS has loaded substantially all its kernel components at boot.

8. The method of claim 1, wherein the creating the soft whitelist is performed before the guest OS has loaded substantially all its kernel components, and the first guest kernel page is from a paged pool range or a non-paged pool range.

9. The method of claim 1, further comprising:
setting a lockdown feature bit in the hypervisor during domain creation to enable rootkit protection.

10. An apparatus, comprising:
a memory;
a processor; and
a hypervisor, such that the apparatus is configured for
creating a soft whitelist having an entry corresponding to a first guest kernel page in a guest operating system (OS) in a hypervisor environment comprising the hypervisor;
receiving an access attempt to a second guest kernel page;
generating a page fault when the access attempt is made to the second guest kernel page;
determining whether the second guest kernel page corresponds to the entry in the soft whitelist;
fixing the page fault to allow an access and execution of the second guest kernel page if the second guest kernel page corresponds to the entry in the soft whitelist; and
denying an execution of the second guest kernel page if the second guest kernel page does not correspond to the entry in the soft whitelist.

11. The apparatus of claim 10, wherein the apparatus is further configured for:
marking the first guest kernel page as read-only and executable if the page fault is an instruction page fault and the second guest kernel page corresponds to the entry in the soft whitelist.

12. The apparatus of claim 10, wherein the apparatus is further configured for:
if the page fault is a data page fault and the second guest kernel page does not correspond to the entry in the soft whitelist:
fixing the page fault; and
marking the second guest kernel page as non-executable.

13. The apparatus of claim 10, wherein the creating the soft whitelist comprises adding a machine page frame number (MFN) corresponding to a virtual address of the first guest kernel page into a hash.

14. The apparatus of claim 10, wherein
the denying the execution comprises one of:
causing the guest OS to loop;
injecting an exception in the guest OS; or
fixing the page fault and pointing a corresponding PTE in a shadow page table of the hypervisor to a crafted page instead of the second guest kernel page, wherein the crafted page comprises code that either causes the guest OS to crash or executes a set of No Operations (NOP) instructions.

15. Logic encoded in non-transitory media that includes code for execution and, when executed by a processor, is operable to perform operations comprising:
creating a soft whitelist having an entry corresponding to a first guest kernel page in a guest operating system (OS) in a hypervisor environment comprising a hypervisor;
receiving an access attempt to a second guest kernel page;
generating a page fault when the access attempt is made to the second guest kernel page;
determining whether the second guest kernel page corresponds to the entry in the soft whitelist;
fixing the page fault to allow an access and execution of the second guest kernel page if the second guest kernel page corresponds to the entry in the soft whitelist; and
denying an execution of the second guest kernel page if the second guest kernel page does not correspond to the entry in the soft whitelist.

16. The logic of claim 15, the operations further comprising:
marking the first guest kernel page as read-only and executable if the page fault is an instruction page fault and the second guest kernel page corresponds to the entry in the soft whitelist.

17. The logic of claim 15, the operations further comprising:
- if the page fault is a data page fault and the second guest kernel page does not correspond to the entry in the soft whitelist:
  - fixing the page fault; and
  - marking the second guest kernel page as non-executable.

18. The logic of claim 15, wherein the creating the soft whitelist comprises adding a machine page frame number (MFN) corresponding to a virtual address of the first guest kernel page into a hash.

19. The logic of claim 15, the operations further comprising:
- marking a PTE corresponding to the first guest kernel page as NOT_PRESENT in a shadow page table of the hypervisor.

20. The logic of claim 19, wherein
the denying the execution comprises one of:
- causing the guest OS to loop;
- injecting an exception in the guest OS; or
- fixing the page fault and pointing a corresponding PTE in the shadow page table to a crafted page instead of the second guest kernel page, wherein the crafted page comprises code that either causes the guest OS to crash or execute a set of No Operations (NOP) instructions.

* * * * *